United States Patent [19]

Moody et al.

[11] 4,198,821

[45] Apr. 22, 1980

[54] DEVICES FOR EXTRACTING ENERGY FROM WAVE POWER

[75] Inventors: George W. Moody, East Kilbride, Scotland; John L. Wilson, Sunbury-on-Thames, England; Stephen H. Salter, Edinburgh, Scotland

[73] Assignee: The Secretary of State for Energy in Her Britannic Majesty's Government of the United Kingdom of Great Britain and Northern Ireland, London, England

[21] Appl. No.: 922,639

[22] Filed: Jul. 7, 1978

[30] Foreign Application Priority Data

Jul. 8, 1977 [GB] United Kingdom ............... 28849/77

[51] Int. Cl.² .......................... E02B 9/08; F03B 13/12
[52] U.S. Cl. ....................................... 60/398; 290/53; 405/76; 417/100
[58] Field of Search .................... 60/398, 497; 290/42, 290/53; 417/100, 330, 331; 405/76

[56] References Cited

U.S. PATENT DOCUMENTS

| | | | |
|---|---|---|---|
| 1,791,239 | 2/1931 | Braselton | 417/100 |
| 3,200,255 | 8/1965 | Masuda | 290/42 |
| 4,123,185 | 10/1978 | Hagen et al. | 417/100 X |

FOREIGN PATENT DOCUMENTS 385909 1/1933 United Kingdom .
1492427 11/1977 United Kingdom .

*Primary Examiner*—Edgar W. Geoghegan
*Attorney, Agent, or Firm*—Larson, Taylor and Hinds

[57] ABSTRACT

The invention provides a device for extracting energy from waves on a liquid, the device having a chamber with an opening for the flow of liquid into and out of the chamber to provide a quantity of the liquid which is arranged to oscillate in the chamber to provide energy from these oscillations. In order to maximize the energy absorption efficiency of the device, that portion of the device to be submerged and lie in a vertical plane aligned in the direction of propagation of the waves is of asymmetric shape, and the device is arranged to be held in a manner to inhibit movement of the device itself in response to the waves.

6 Claims, 10 Drawing Figures

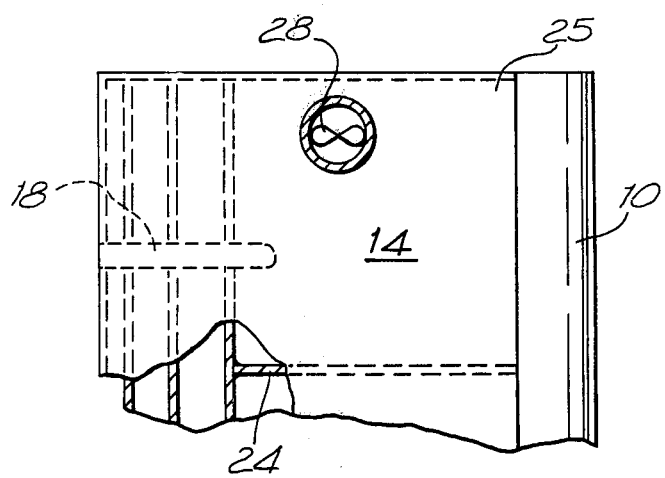
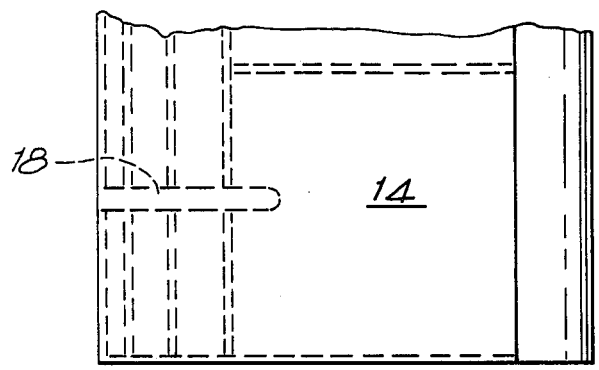
FIG. 1a.

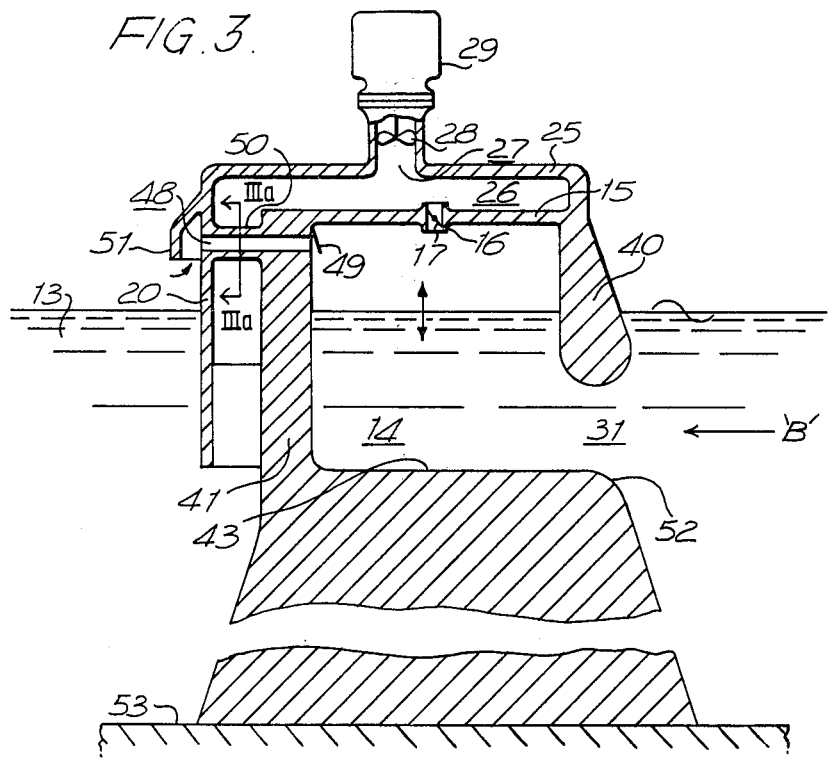
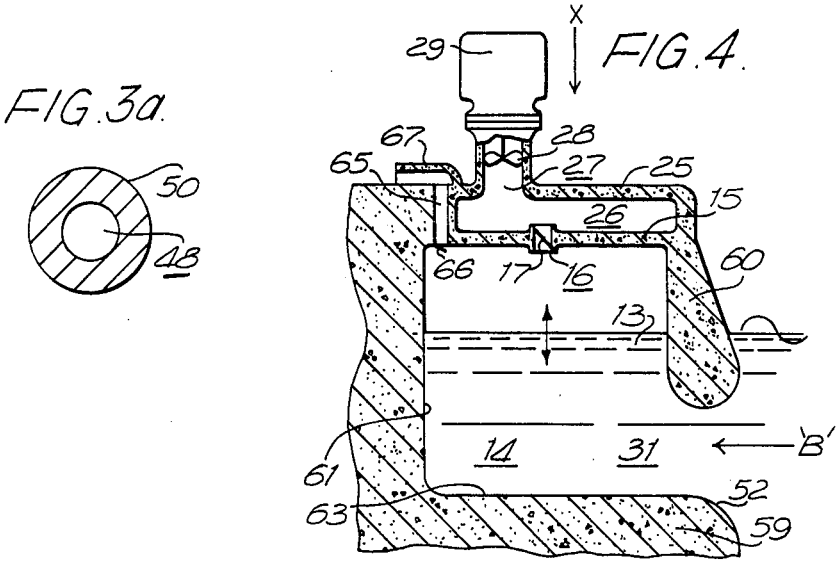

DEVICES FOR EXTRACTING ENERGY FROM WAVE POWER

This invention relates to devices for extracting energy from waves.

An example of a device adapted to generate electricity from energy extracted from waves is provided by the buoy device invented by Yoshio Masuda and described in British patent specification No. 1,014,196, in which the oscillation of a column of water in a chamber is arranged to drive air through an air turbine.

A breakwater is another example of a device intended to extract energy from waves but so as to provide calmer regions on its leeward side.

According to the present invention, there is provided a device adapted to be partially submerged in a liquid and extract energy from waves thereon, wherein that portion of the device adapted to be below the surface of the liquid is of asymmetric shape in a vertical plane aligned in the direction of propagation of the incoming waves, and the device is adapted to be held by means for inhibiting movement of the device in the liquid so that in operation waves generated by the device itself are substantially unidirectional and in a direction towards the incoming waves.

The device may be of buoyant construction, and adapted to be held below its natural level of floatation in the liquid by mooring means so as to inhibit said movement of the device. Alternatively, the device may be of non-buoyant construction and adapted to be held by a submerged support means which may include the sea bed.

In yet a further alternative, the device may be held by being adapted for incorporation in a barrier means arranged to be incident to incoming waves, for example a coastal sea wall.

The asymmetric shape may be provided by having the front of the device upon which the waves are intended to be incident, arranged so as to be immersed less deeply in the liquid than the rear of the device. In a device having a chamber in which a column of water is arranged to oscillate, the asymmetric shape may be provided by closing the bottom of the chamber, and providing a port means at the incoming wave side of the chamber positioned so as to be immersed in the liquid.

A stationary partially submerged device which has a symmetrical underwater shape in a vertical plane aligned in the direction of incoming waves will have a theoretical maximum power absorption of about 50% if the energy of the incoming waves, the remaining wave energy being lost and distributed equally between reflected and transmitted waves. By adopting an asymmetric underwater shape as required by the invention, by which waves generated by the device itself in extracting energy from the incoming waves are unidirectional and towards the incoming waves, the energy absorption efficiency of the device is increased. This is because a device which generates and radiates waves preferentially in a certain direction when in forced oscillation will also absorb that frequency preferentially from the same direction, so that theoretically in an idealised condition there will be no reflected and transmitted waves through which energy may be lost. In practice, however, this condition is unlikely to be realised but energy extraction efficiencies above 50% should be attainable by devices incorporating the invention.

To enable the present invention to be more readily understood attention is directed by way of example only to the accompanying drawings, in which:

FIG. 1a shows a view in the direction of arrow 'A' in FIG. 1;

FIG. 1b shows a view in the direction of arrow 'C' in FIG. 1a;

FIG. 3 shows a diagrammatic sectional representation of a device similar to that shown in FIG. 2 but of non-buoyant construction;

FIG. 3a shows a fragmentary sectional view to an enlarged scale on the line IIIa—IIIa of FIG. 3;

FIG. 4 shows a diagrammatic sectional representation of a device similar to those shown in FIG. 2 and FIG. 3 but incorporated in a sea barrier;

In the above Figures, like parts have like numerals.

Figure 1:
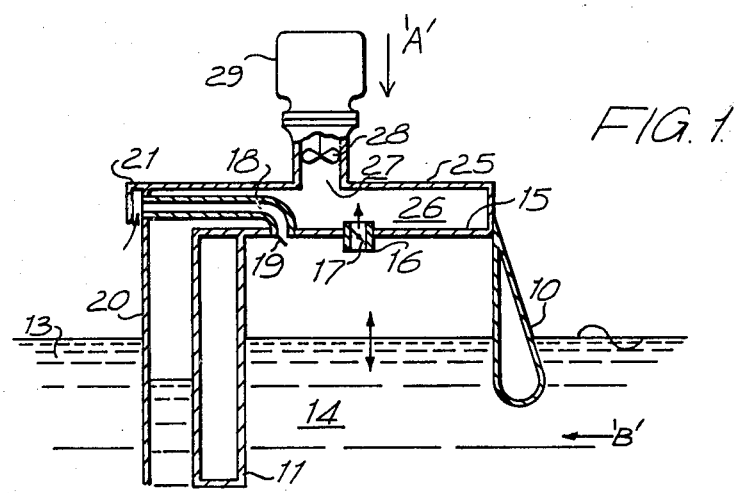
FIG. 1 shows a diagrammatic sectional representation of a buoyant device having one asymmetric shape and for generating electrical energy from wavepower.

Referring now to FIG. 1, the device shown has a forward buoyancy tank 10 and a rear buoyancy tank 11 for supporting the device in a lqiuid 13 (e.g. seawater), the forward buoyancy tank 10 being immersed less deeply in the liquid 13 than the rear buoyancy tank 11. The forward and rear buoyancy tanks 10 and 11 respectively define between them the front and rear walls of a chamber 14 in which a column of the liquid 13 oscillates as indicated by the arrows as a result of wave motion of the incoming waves in the direction of arrow 'B.' The chamber 14 has a roof 15 with an air outlet 16 having a non-return valve 17, and an air inlet 18 having a non-return valve 19. The air inlet 18 is connected at its other end to the rear wall 20 of the device where it is protected against spray by a shroud 21.

The rear wall 20 and a cover 25 define a duct 26 for air between the aft buoyancy tank 11 and the roof 15 as described in U.S. application Ser. No. 824,832 now U.S. Pat. No. 4,139,984 issued Feb. 20, 1979, to interconnect the air discharged from adjacent chambers 14.

An orifice 27 in the cover 25 directs air from the duct 26 through an air turbine 28 which is arranged to drive an electric generator 29.

Figure 1B:
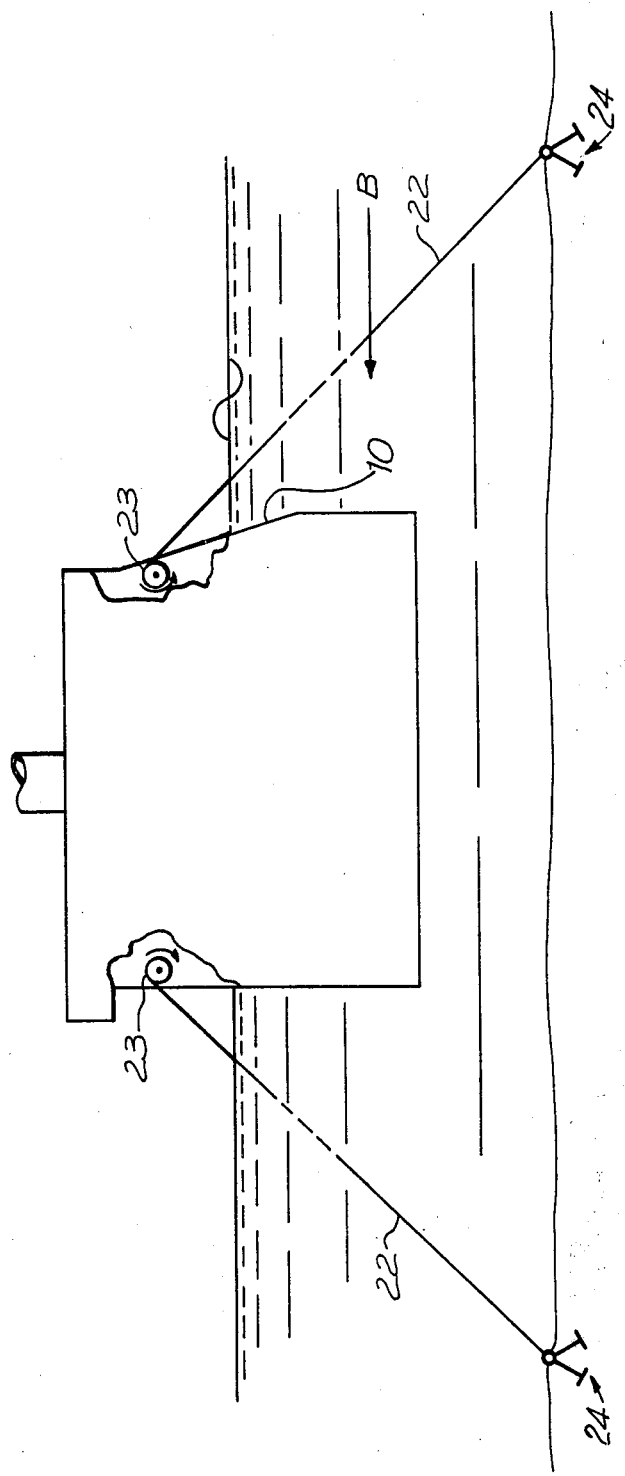

As shown in FIG. 1a several chambers 14 having side walls 24 are connected in parallel by the duct 26 to drive the single air turbine 28, the generator 29 of FIG. 1 being omitted for clarity. The device is held as shown in FIG. 1b, to which reference is made by mooring means in the form of cables 22 each attached at one end to a respective winding gear 23 (only two are shown) on the device, and to a respective anchorage 24 in the sea bed to inhibit movement of the device. The cables 22 are kept taut by constructing the device to have excess buoyancy and hauling on the cables 22 with the winding gear 23 to pull the device downwardly below its natural floatation level in the liquid 13 to a required mean depth of immersion. Such cables 22 may be supplied by British Ropes Limited, Doncaster, England.

In operation, energy is extracted from the incoming waves by the oscillation of the liquid 13 in the chamber 14 drawing air into the chamber 14 through inlet 18 and expelling air from the chamber 14 through the outlet 16 and into the duct 26. The pressure of the air in the duct 26 depresses the liquid level at the rear of the rear buoyancy tank 11 to provide a restoring force acting on the air and tending to maintain a substantially uniform air pressure in the duct 26. Air from the duct 26 escapes through the orifice 27 and drives the air turbine 28 which drives the electric generator 29. Because of the asymmetric underwater shape of the device, the energy extracted from the waves is greater than that extracted by a similar device but having a symmetric underwater shape.

In the alternative asymmetric shape shown in FIG. 2 to which reference is now made, the chamber 14 is closed at the bottom by a baseplate 30 which defines a front entry port 31 for the chamber 14 below the buoyancy tank 10. In other respects the device shown in FIG. 2 is identical to that shown in FIGS. 1 and 1a, and its asymmetric underwater shape increases its energy absorption efficiency in the same way compared with a device having a symmetric underwater shape.

Figure 2:
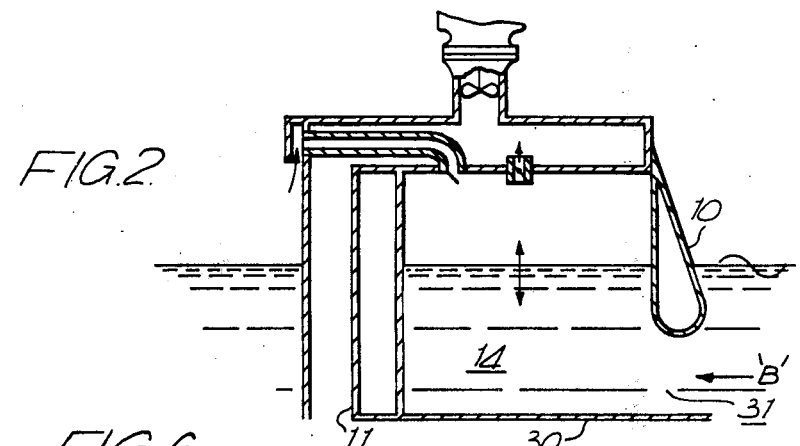
FIG. 2 shows a diagrammatic sectional representation of a device similar to that shown in FIG. 1 but having an alternative asymmetric underwater shape.

The device of FIG. 2 may be held by mooring means (not shown) similar to those described in relation to FIG. 1b.

As an alternative to the buoyant devices shown in FIGS. 1, 1a, 1b, and 2, a non-buoyant device may be used as shown in FIG. 3, to which reference is now made, for applications where tidal movement is relatively limited.

The device of FIG. 3 is similar in most respects to the device of FIG. 2 except that the use of buoyancy tanks has been dispensed with to provide the non-buoyant construction required. The device is provided with a solid forward wall 40, a solid rear partition 41, and a solid base portion 43, which define the corresponding portions of a chamber 14 similar to that of FIG. 2. An air inlet 48 having a non-return valve 49 extends from the chamber 14 through the rear partition 41, a boss 50 extending in the duct 26, and the rear wall 20 where the air inlet 48 is protected by a shroud 51. The boss 50 is also shown in fragmentary sectional view in FIG. 3a to which reference can be made.

The base portion 43 has a rounded corner 52 at a front entry port 31 to the chamber 14, and is shown resting on a submerged surface 53, such as the sea bed, to present the device at the required partially submerged depth in the liquid 13. In all other respects, the device of FIG. 3 is essentially the same as the device of FIG. 2 and extracts energy from waves on the liquid 13 in an identical manner.

It will be understood that cables (not shown) may be attached to the device of FIG. 3 to retain it in its required position on the submerged surface 53, and weights (not shown) provided to increase the inertia of the device.

The invention may also be incorporated in a barrier as shown in FIG. 4, to which reference is now made, for installations subject to relatively limited tidal movement.

In FIG. 4 a portion of a coastal sea wall 59 of ferroconcrete construction is shown, and is shaped to provide the essential features of a device similar to that of FIG. 3 for extracting energy from incoming waves on the sea 13. In more detail the device of FIG. 4 has a forward wall 60, a rear wall 61, and a base portion 63, which define the corresponding portions of a chamber 14 having a front entry port 31 similar to that of FIGS. 2 and 3.

An air inlet 65 having a non-return valve 66 extends upwardly from the chamber 14 to the top of the device where it is protected from spray by a shroud 67. The device has a duct 26 into which air from the chamber 14 enters through the outlet 16 and non-return valve 17 in a similar manner to that described in relation to FIGS. 1 to 3. The duct 26 is shown unpressurised, but may be arranged to be pressurised as described in aforementioned U.S. application Ser. No. 824,832. In all other respects, the device of FIG. 4 is essentially the same as the devices of FIGS. 2 and 3 and extracts energy from the incoming waves in an identical manner.

Figure 5:
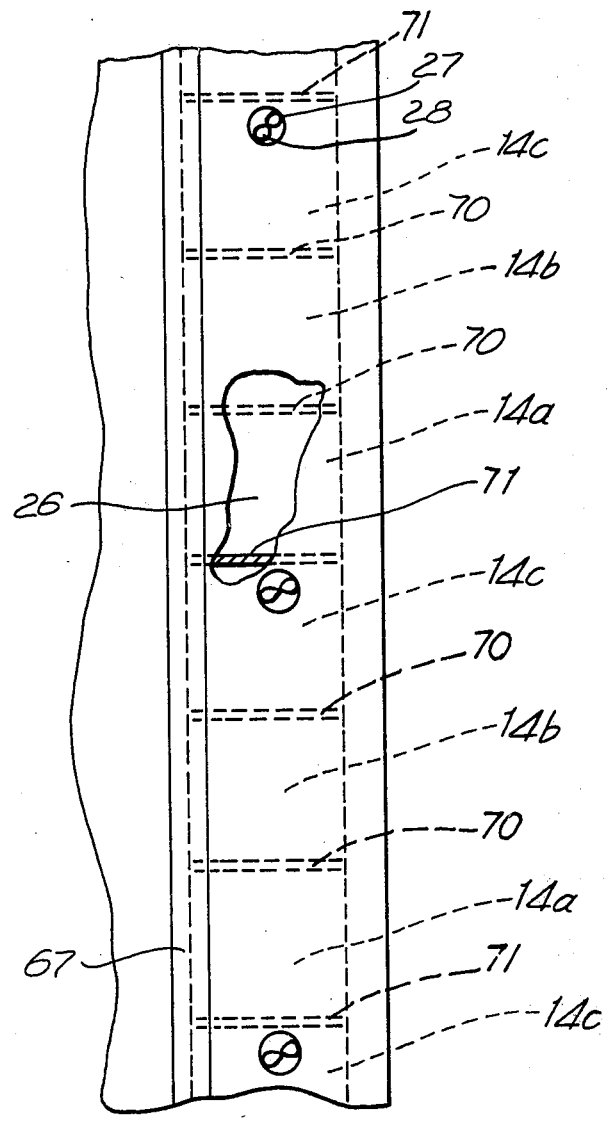
FIG. 5 shows a fragmentary view to a reduced scale in the direction of arrow X of FIG. 4.

The device of FIG. 4 may be of considerable length broadside to the incident waves, and arranged as a multiplicity of chambers 14, as shown in FIG. 5 to which reference is now made. In FIG. 5 sets of three chambers 14a, 14b, 14c are shown connected by a common duct 26 to a single orifice 27 and air turbine 28 along the length of the device, the generator 29 of FIG. 4 being omitted for clarity. The chambers 14a and 14b, and 14b and 14c are separated by side walls 70 below the duct 26 but the chambers 14c and 14a are separated by side walls 71 which extend into the duct 26 to separate the air flow in one set of chambers 14a, 14b, 14c from that in another set. If desired a similar arrangement of sets of chambers 14 may be used in relation to the devices of FIGS. 1 to 3, and it will be understood that a set of chambers 14 may comprise more than three chambers 14, or two such chambers 14.

Figure 6:
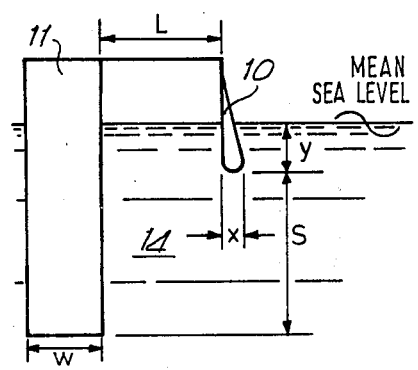
FIG. 6 shows a diagrammatic model of part of a device similar to that of FIG. 1.

Referring now to FIG. 6 the essential features of a device similar to that of FIG. 1 are shown in a vertical plane aligned with the incoming wave for the purpose of establishing the dimensions thereof for maximum power absorption efficiency. These features are represented by:

L = distance in the chamber 14 between the forward buoyancy tank 10 and the rear buoyancy tank 11 x = width at the bottom and maximum width of the forward buoyancy tank 10 y = distance between the bottom of the forward buoyancy tank 10 and mean sea level s = vertical distance between the bottom of the forward buoyancy tank 10 and the bottom of the rear buoyancy tank 11 w = width at the bottom of the rear buoyancy tank 11 fo = frequency of the incoming waves.

Figure 7:
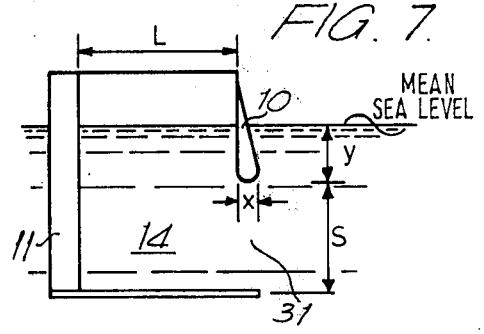
FIG. 7 shows a diagrammatic model of part of a device similar to that of FIG. 2.

For maximum power absorption efficiency:

$$fo = \frac{1}{2\pi}\sqrt{\frac{g}{y + \frac{\pi L}{4}}}$$

where g = acceleration due to gravity $L \leq s \leq 2L$ $0.25\,L \leq y \leq 0.5\,L$ $0.5\,y \leq x \leq y$ $L \leq W \leq 3L$ The essential features of a device similar to that of FIG. 2 in a vertical plane aligned in the direction of propagation of the waves are shown in FIG. 7 to which reference is now made.

The features are represented by:

L = distance in the chamber 14 between the forward buoyancy tank 10 and the rear buoyancy tank 11 x = width at the bottom and maximum width of the forward buoyancy tank 10 y = distance between the bottom of the forward buoyancy tank 10 and mean sea level s = height of the front entry point 31.

For maximum power efficiency:

$$L = 0.1 \lambda_0$$

where $\lambda_0 = (g/2\pi f_0)2$ = wavelength of the incoming waves corresponding to the natural frequency, $f_0$, of the water column in the chamber 14.

$$\left. \begin{array}{l} s = 0.67\ L \\ y = 0.4\ L \\ x = 0.25\ L \end{array} \right\} \text{approximately}$$

The devices of FIGS. 1 to 5 may be provided with means for changing the resonant frequency of the liquid 13 in the chamber 14, for example as described in United Kingdom application No. 19199/77, to optimize the device for maximum energy absorption efficiency over a range of incoming wave frequencies.

It will be appreciated that other asymmetric underwater shapes may be used in accordance with the invention, and asymmetric underwater shapes may be incorporated in alternative devices for extracting energy from wavepower to those shown in the Figures, for example a breakwater. Such a breakwater might be provided by the devices shown in the Figures but with the air turbine 28 and electric generator 29 dispensed with and the dimensions of the orifice 27 selected to maximize the energy loss as air is driven therethrough.

The devices shown in FIGS. 1 and 3 may be made from materials conventionally used by those skilled in the art of designing devices for extracting energy from wavepower depending on the chemical properties of the liquid and the forces to which the device is likely to be subjected in use (e.g. metals, or ferro-concrete). Although alternative materials can be used for the device of FIG. 4, ferroconcrete is likely to be the preferred material.

It will be understood that although the invention has been described in relation to a device having several chambers in which the oscillation of a column of liquid in each chamber is used to discharge air into a common duct, the invention may also be incorporated in a device having at least one such chamber from which air is discharged directly to an air turbine.

The invention may also be incorporated in devices having alternative means for rectifying the air discharged from adjacent chambers before the air is directed to an air turbine, and also in devices having alternative means of deriving mechanical power from the oscillations of a column of liquid in a chamber of the device.

We claim:

1. A device for extracting energy from waves on a liquid in which the device is adapted to float, the device having, a chamber with an opening for the flow of the liquid into and out of the chamber to provide a quantity of the liquid which is arranged to oscillate in the chamber from the motion of the waves, and means arranged to extract some of the energy of the oscillating liquid in the chamber, wherein the improvement comprises:
   (a) an asymmetric shape of that portion of the device adapted to be submerged and lie in a vertical plane aligned in the direction of propagation of the incoming waves, and
   (b) mooring means for holding the device below the natural level of floatation of the device in the liquid so as to inhibit movement of the device in response to said waves, so that in operation waves generated by the device itself are substantially unidirectional and in a direction towards said incoming waves.

2. A device as claimed in claim 1, including
   (a) the chamber having an open lower end,
   (b) the chamber having a forward wall with respect to incident waves incoming towards the device, and
   (c) the chamber having a rear wall with respect to said incident waves, the forward wall being shorter in depth than the rear wall so as to be immersed less deeply in the liquid than the rear wall and thereby provide said asymmetric shape.

3. A device as claimed in claim 1, including
   (a) a closed end at the lower end of the chamber,
   (b) the chamber having a rear wall with respect to incident waves incoming towards the device, and
   (c) the chamber having a forward wall with respect to said incident waves and shaped to define at least in part said opening, thereby to provide said asymmetric shape.

4. A device as claimed in claim 1, including a multiplicity of linearly connected said chambers arranged in sets of said chambers, each set comprising a plurality of said chambers arranged to energise a single energy extraction means.

5. A device for extracting energy from waves on a liquid in which the device is adapted to float, the device having a chamber with an opening at the lower end thereof for the flow of the liquid into and out of the chamber to provide a quantity of the liquid which is arranged to oscillate in the chamber from the motion of the waves, an inlet for air sucked into the chamber and an outlet for air discharged from the chamber by the oscillation of the liquid in the chamber, and an air turbine means arranged to be driven by the air discharged from the chamber, wherein the improvement comprises, the device having an asymmetric shape in a vertical plane aligned in the direction of propagation of the waves, said shape being provided by,
   (a) a rear wall of the chamber with respect to incident waves incoming towards the device, and
   (b) a forward wall of the chamber with respect to said incident waves and shorter in depth than said rear wall so as to be immersed less deeply in the liquid,
      (i) the difference between the mean depth of immersion of the forward wall and the rear wall of the chamber being not less than the distance in the chamber between said walls and not greater than twice said distance between said walls;
      (ii) the mean depth of immersion of said forward wall of the chamber being not less than one quarter of the distance in the chamber between said forward wall and said rear wall of the chamber and not greater than one half of said distance between said walls;
      (iii) said rear wall of the chamber having a thickness at the lower end thereof in said vertical plane not less than the distance in the chamber between said forward wall and said rear wall of the chamber and not greater than three times said distance between said walls, and (c) said forward wall of the chamber having a thickness at the lower end thereof in said vertical plane not less than one half the mean depth of immersion of said forward wall and not greater than said mean depth of immersion of said forward wall and, mooring means provided for holding the device below the natural level of floatation of the device in the liquid so as to inhibit movement of the device in response to said waves, so that in operation waves generated by the device itself are substantially unidirectional and in a direction towards said incoming waves.

6. A device for extracting energy from waves on a liquid in which the device is adapted to float, the device having a chamber with an opening for the flow of the liquid into and out of the chamber to provide a quantity of the liquid which is arranged to oscillate in the chamber from the motion of the waves, an inlet for air sucked into the chamber and an outlet for air discharged from the chamber by the oscillation of the liquid in the chamber, and an air turbine means arranged to be driven by the air discharged from the chamber, wherein the improvement comprises, the device having an asymmetric shape in a vertical plane aligned in the direction of propagation of the waves, said shape being provided by, (a) a closed end at the lower end of the chamber,
(b) a rear wall of the chamber with respect to incident waves incoming towards the device, and
(c) a forward wall of the chamber with respect to said incoming waves, said forward wall being shaped to define at least in part said opening,
 (i) the height of said opening being about 0.67 of the distance in the chamber between the forward wall and the rear wall,
 (ii) the mean depth of immersion of the forward wall of the chamber above the opening being about 0.4 of the distance in the chamber between the forward wall and the rear wall, and
 (iii) said forward wall of the chamber having a thickness at the lower end thereof above the opening in said vertical plane about 0.25 of the distance between said forward wall and said rear wall, and mooring means provided for holding the device below the natural level of floatation of the device in the liquid so as to inhibit movement of the device in response to said waves, so that in operation waves generated by the device itself are substantially unidirectional and in a direction towards said incoming waves.

* * * * *